March 13, 1962  R. PERIERES ET AL  3,025,333
VAPORIZING APPARATUS FOR SOLID SUBSTANCES
Filed July 27, 1960  4 Sheets-Sheet 3

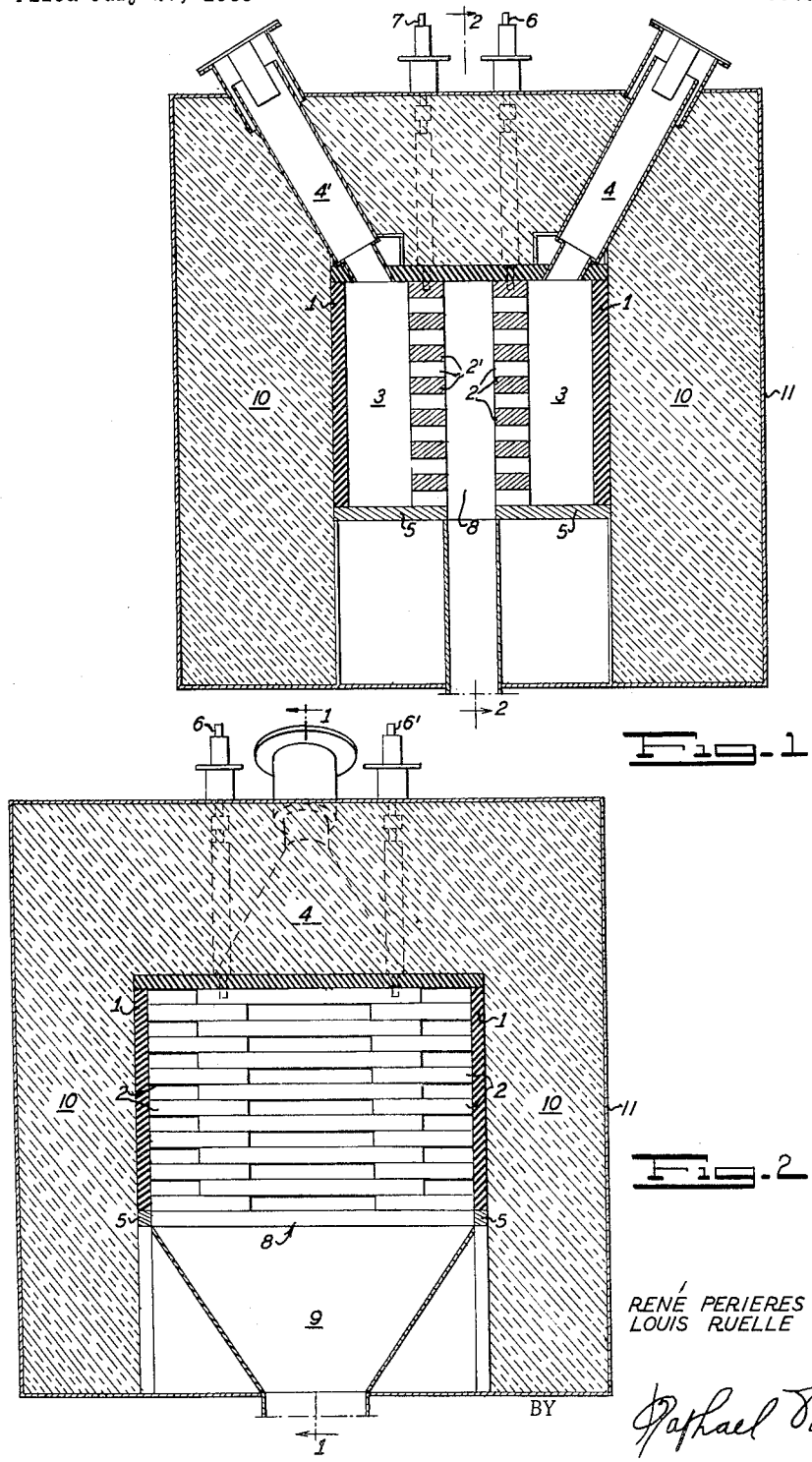

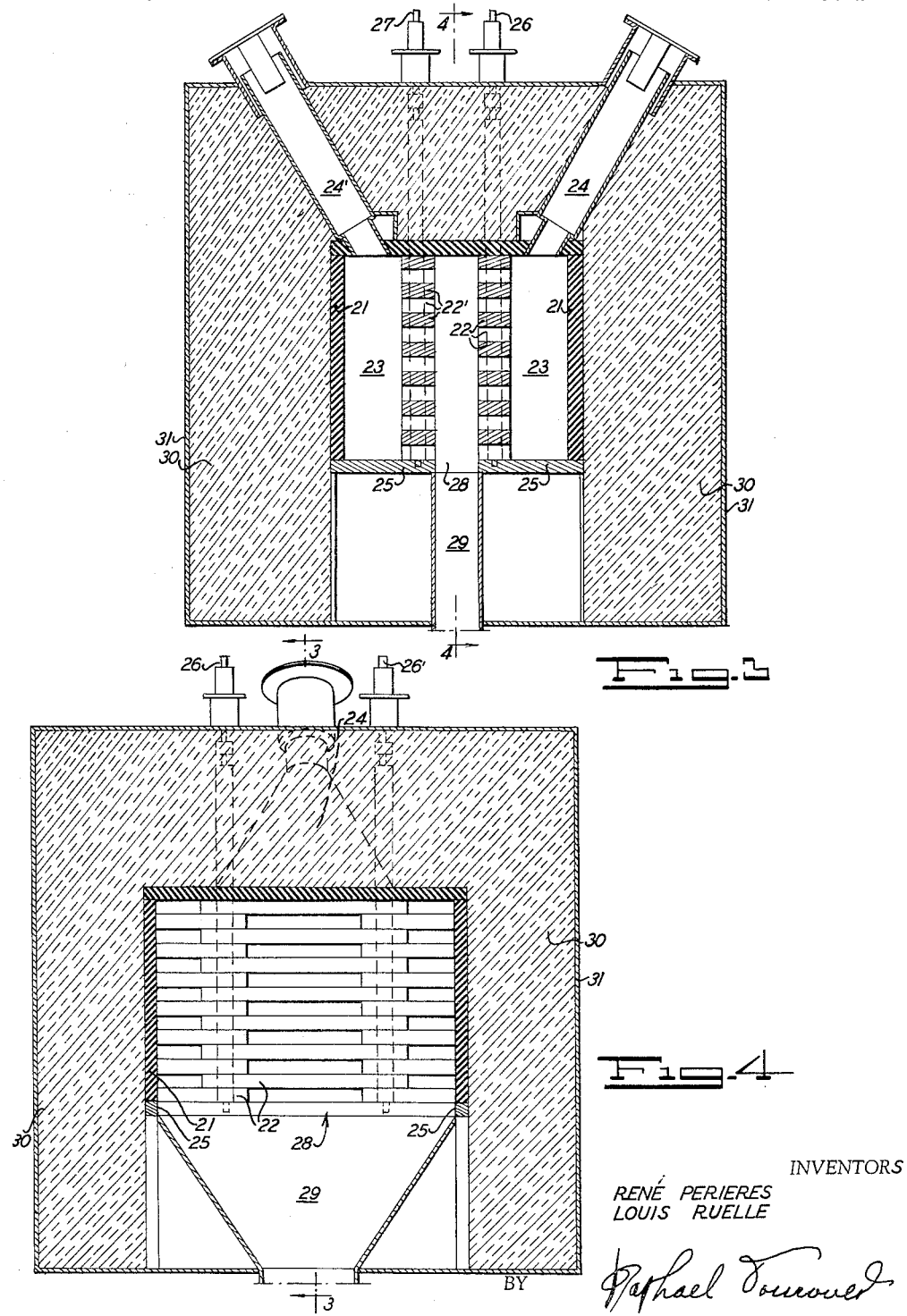

INVENTORS
RENÉ PERIERES
LOUIS RUELLE

BY  *Raphael Tourvold*
ATTORNEY

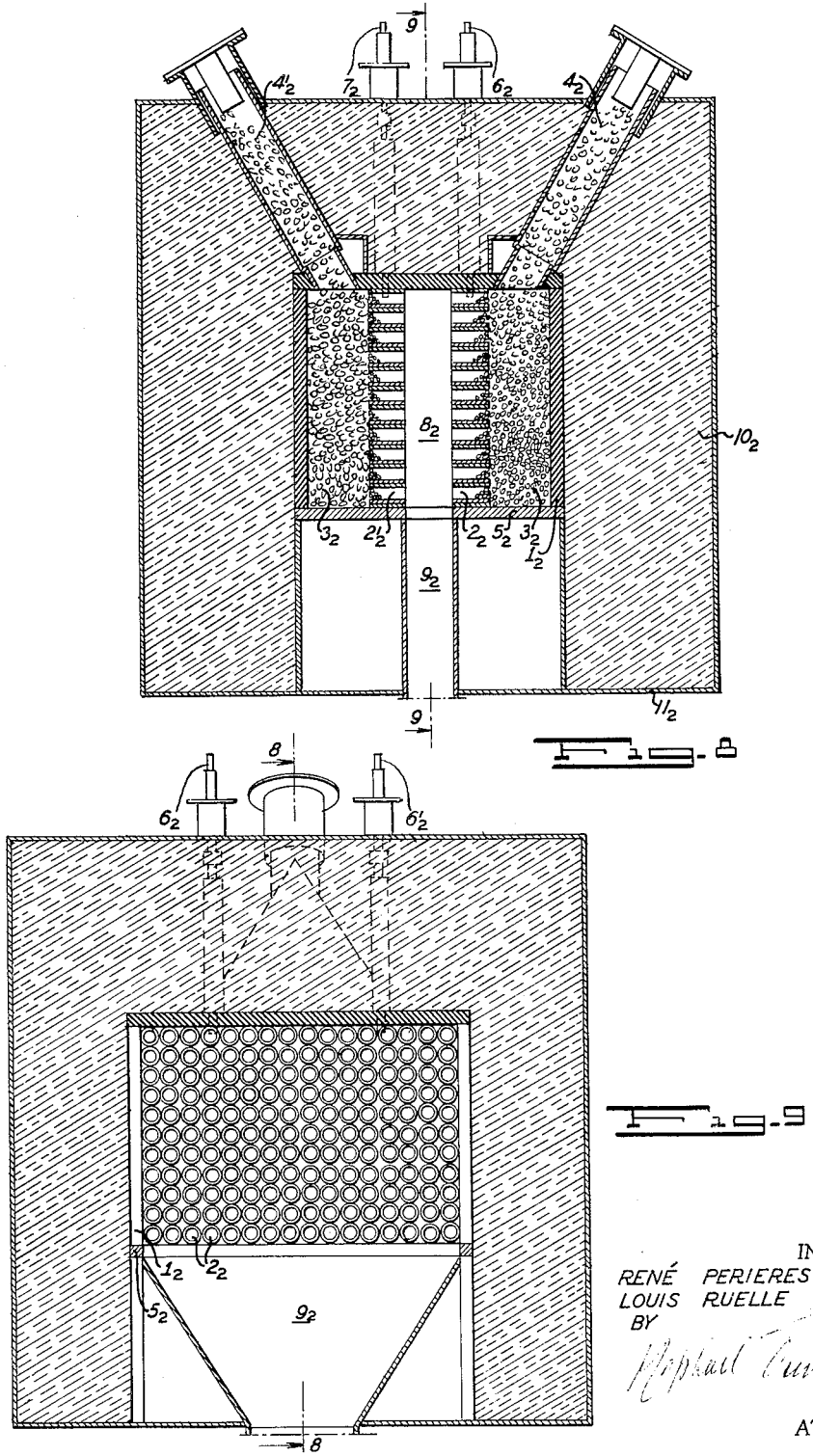

United States Patent Office 3,025,333
Patented Mar. 13, 1962

3,025,333
VAPORIZING APPARATUS FOR SOLID SUBSTANCES
René Perières, La Tronche, and Louis Ruelle, Grenoble, France, assignors to Pechiney, Compagnie de Produits Chimiques et Electrometallurgiques, Paris, France, a corporation of France
Filed July 27, 1960, Ser. No. 45,671
Claims priority, application France Aug. 4, 1959
12 Claims. (Cl. 13—20)

The present invention relates to a novel system of vaporizing apparatus for treating solid substances at high temperatures and concerns, more particularly, the treatment of substances the thermal decomposition of which produces the liberation of gases or vapors, leaving or not leaving behind a solid residue.

It is known that such apparatus only satisfies the requirements of industry when operating continuously and when it is able to provide a large hourly output. To this end, it is necessary that the vaporizing surface be as large as possible and heated in a uniform manner.

These different requirements, however, present great difficulties, especially in the treatment of solid substances which must be capable of circulating in the furnace and, hence, be capable of being divided into elements, i.e. into particulate form of small size while avoiding nevertheless, small fragments of the solid substances from being entrained by the gaseous current.

Applicants' researches have enabled them to develop a vaporizing system which makes it possible to meet the various industrial problems involved.

The present invention has for its object a system for vaporizing solid substances, which has a high heat transfer rate, and wherein the heating zone (or zones) are closely adjacent to and/or in contact with, and/or opposite to the vaporizing surface of the treated solid substance, and/or wherein the heating of said substance is directly supplied by thermal conduction and/or by conduction and thermal radiation, and/or wherein overheating of the heating zone (or zones) in respect to the vaporizing temperature of said substance is at a minimum, and/or wherein any overheating at the very contact of said substance is suppressed.

The present invention has also for its object a system for vaporizing solid substances, having a large hourly production rate, wherein the vaporizing surface is very large and/or wherein the treated solid substance is continuously renewed as fast as it disappears, partially or totally, and/or wherein the volatile products obtained are immediately separated from the treated solid substance without having to pass through the mass of said substance upon their disengagement, and/or wherein any entrainment of solid substance by the gases and vapors, produced in the course of the vaporization, is completely avoided.

The other objects of the present invention will be disclosed in the course of the following description.

Applicants have developed a system for vaporizing solid substances totally or partially, which has a high heat transfer rate and a large hourly output, and comprises one or more units composed of:

(a) A series of parallel plates, arranged so as to form a hollow central shaft or flue, constituting a disengagement zone into which disengage the volatile products, gases or vapors resulting from the vaporization of the treated solid substances;

(b) One or more heating devices, partially or totally integral (united) with said series of plates;

(c) A zone of slight thickness of the order of a few centimeters, for example of 2 to 30 cm., external to the series of plates and filled with the solid substance to be treated.

In addition, the said apparatus comprises:

(1) A wall constituting a casing which forms the exterior boundary of the heating zone wherein the treated solid substance is maintained, and which wall resists attack by said substance or the volatile products liberated in the course of the treatment;

(2) A heat insulating lining surrounding said casing;

(3) A rigid external wall which retains the assembly of the vaporizing system and constitutes the frame;

(4) One or more devices for charging the solid substance to be treated;

(5) A device for collecting the gases or vapors produced by the vaporization.

Eventually, there is also provided one or more devices for evacuating through a suitable outlet solid residues which may result from the vaporizing process, also, when needed, any apparatus for measuring or controlling temperature, pressure, etc., well known per se.

According to the invention, the plates referred to above slope downwards, with a given angle which depends on the angle of repose ("talus") of the solid substance to be treated; the substance penetrates between the plates, forming thereby a very large and extended vaporizing surface which is automatically and continuously renewed by the fresh solid substance which descends into the apparatus as the vaporization proceeds.

According to a special embodiment of the invention, the above mentioned plates are replaced by a pile of small hollow tubes of small cross section, forming a honeycomb structure. In this embodiment, the length and diameter of the tubes are so correlated to the angle of repose of the particulate material being treated, that the sloping mass of the material is retained within the tubes.

According to another embodiment of the invention, the plates are used directly as heating elements; in this case, they are made of material which has sufficient electric conductivity such as, for example, carbon, to form a resistor.

Further, according to a special embodiment of the present invention, the wall forming a casing which is tightly sealed to the formed volatile products and which forms the external boundary of the zone wherein lies the treated solid substance, is built up in situ from said substance, which is stratified and/or sintered by being more or less impregnated with its own vaporization products, which settle and solidify upon mere contact, at a distance sufficiently far from the heating zone to be at a temperature below that of the vaporization temperature of the substance.

According to the invention, the heat insulating lining surrounding said wall is then substantially formed, partially or totally, of the same substance as the solid substance treated.

The accompanying figures, which are in no way limiting, have for their sole aim to illustrate the various objects of the present invention. Any other embodiment which includes, separately or in combination, the various characteristics above described, falls within the scope of the present invention.

In the drawings:

FIGURE 1 is a schematic sectional view of half (as on line 1—1 of FIG. 2) of a parallelepipedic vaporizer comprising but a single unit, the other half (not shown) being similar;

FIGURE 2 is a schematic sectional view of half (as on line 2—2 of FIG. 1) of a parallelepipedic vaporizer, the other half (not shown) being similar. As is obvious, the sections shown in FIGURES 1 and 2 are taken at right angles to each other.

Figures 6, 7:
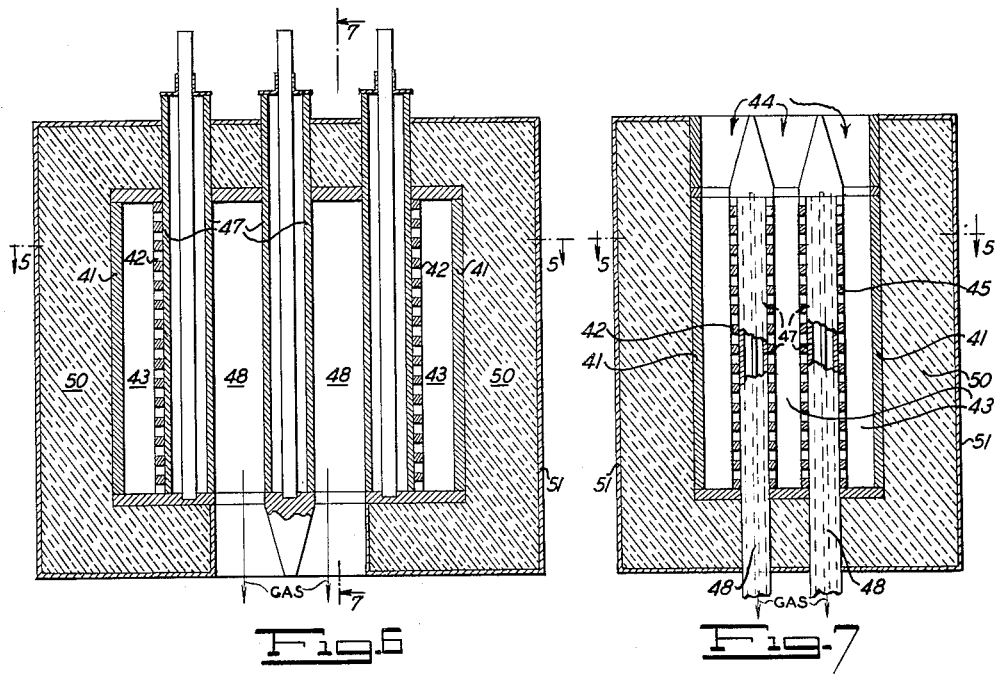
Figure 5:
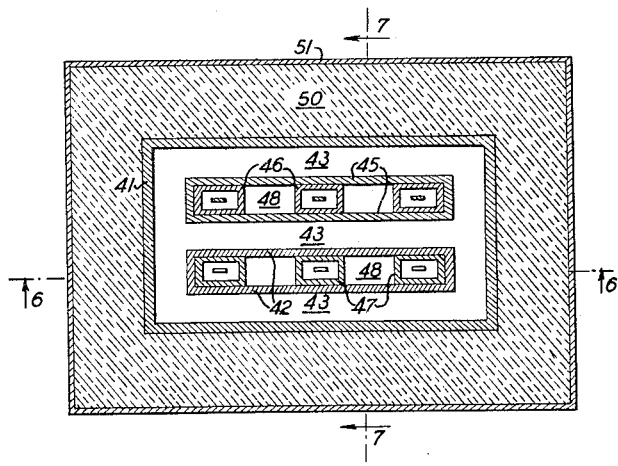

FIGURES 3 and 4 are views, similar to those of FIGURES 1 and 2, of another embodiment of a vaporizer which is closely related to the first embodiment illustrated in FIGURES 1 and 2;

FIGURE 5 is a diagrammatic horizontal section of a parallelepipedic-shaped vaporizer comprising multiple units, heated by conduction and radiation;

FIGURE 6 represents a section taken along line 6—6 of FIGURE 5, while

FIGURE 7 represents a section taken along line 7—7 of FIGURE 5 or FIGURE 6.

FIGURES 8 and 9 are views similar to those of FIGURES 1 and 2 of another embodiment of a vaporizer, which embodiment is closely related to the first embodiment illustrated in FIGURES 1 and 2; in FIGURES 8 and 9, the same parts are denoted by the same reference numerals as in FIGURES 1 and 2 with the addition of a suffix 2.

Referring to FIGURES 1 and 2:

1 is a parallelepipedic casing made of a material suitable to the operating conditions of the apparatus and, preferably, of a material which does not conduct or only conducts electricity very slightly. 2 and 2' are two series of parallelly disposed rectangular plates, forming two openwork (lattice) walls or partitions which rest against the casing 1 by their lateral ends, these plates being made of an electric conductive material, for example, graphite.

3 is the zone filled with the solid substance to be treated, introduced through inlets 4, 4' and maintained between the casing 1 and the series of plates 2, 2'; the dimensions and arrangement of the plates are such in respect to the angle of repose of the material to be treated as to enable them to contain the sloping mass ("talus") of the solid substance.

5 is a base made of an electric conducting material common to both series of plates 2, 2'. 6, 6', 7 and 7' (not shown) are electric current inlets which connect a multiple tap single-phase transformer, not shown in FIGURE 1, with the series of plates 2, 2', which thus constitute an electric resistance circuit in which the energy required for vaporizing the treated solid substance is dissipated by the Joule effect.

8 is the empty central flue through which escape the volatile products, either gases or vapors, produced during the course of the vaporization. 9 is a duct connecting said flue with a condenser, not shown on FIGURE 1; 10 is a heat insulating packing surrounding casing 1; 11 is a rigid metalic wall constituting the frame.

Referring to FIGURES 3 and 4:

21 is a parallelepipedic casing made of any material suitable to the operating conditions of the apparatus. 22, 22' are two series of rectangular plates, arranged in parallel and forming two openwork walls or partitions, and resting against the casing 21 by their lateral ends, said plates being made of any material suitable to the operating conditions of the apparatus.

23 is the zone filled with the solid substance to be treated, which is introduced through the inlets 24, 24' and which is maintained between the casing 21 and the series of plates 22, 22'; the dimensions and arrangement of the plates with respect to the angle of repose of the material being treated are such as to enable them to contain the sloping mass ("talus") of the treated solid substance.

26, 26', 27 and 27' (not shown) are heating elements, housed in said series of plates though without any electric contact with said plates, so that the power required for vaporizing the treated solid substance is furnished by these heating elements and is dissipated by thermal conductivity by the plates.

28 is the empty central flue or shaft through which escape the volatile products, gases and vapors produced in the course of the vaporization. 29 is a duct connecting said shaft with a condenser, not shown on FIGURE 3; 30 is a thermal insulating packing surrounding casing 21; 31 is a rigid metallic wall constituting the frame of the apparatus.

Referring now to FIGURES 5, 6 and 7:

41 is a parallelepipedic-shaped casing made of any material suitable for the operating conditions of the apparatus. 42 and 45 are a series of rectangular plates, arranged parallel to each other, forming two principal shafts constituting the vaporizing elements in the form of openwork walls, said plates being made of any material suitable for the operating conditions of the equipment.

43 is the zone filled with the solid substance to be treated, introduced at 44 and maintained between the casing 41 and the series of plates 42 and 45.

46 and 47 are ducts, sealed (tight) to the formed volatile products and adjacent to and tightly sealed (joined) to the series of plates and containing the heating elements, the above mentioned plates 42, 45 being thus heated directly by conduction from the ducts around which they form heat distributing fins for the treated solid substance.

48 designates the empty shafts or flues through which escape the volatile products, gases and vapors produced in the course of vaporization. 50 is a thermal insulation packing surrounding the casing 41; 51 is a rigid metallic wall constituting the frame of the apparatus. As will be apparent, in this embodiment the openwork partitions or walls built up from the parallel spaced plates 42, 45 form enclosures which comprise not only the disengagement zones or flues 48, but also contain the sealed heating units.

The heating elements represented on the figures are electric resistors; however, it is to be understood that the invention is not limited to this particular heating means, although it is the most commonly used, particularly, for obtaining high temperatures.

The system of vaporizers according to the invention makes it possible to readily heat various vaporization zones to different temperatures. Thus, a top zone can be maintained at a temperature differing from that of a middle zone, the latter being itself maintained at a temperature differing from that of a lower zone. To achieve this end, it is sufficient to provide adequate heating elements. In this way, there can be treated either heterogeneous solid substances the components of which are subjected successively to different temperatures or, else, a homogeneous solid substance which is, for example, heated successively to different temperature levels.

The system of vaporizers which is the object of the present invention can be utilized in a very large number of cases and, among others, in the production of metals by the decomposition of their carbides or nitrides in a vacuum.

While the major heating in the embodiments illustrated in FIGURES 3–7 is by conduction, nevertheless, part of the heating in these embodiments also takes place by radiation.

The embodiment illustrated in FIGURES 8 and 9 is similar to that shown in FIGS. 1 and 2, except that the parallel plates have been replaced by a pile of hollow tubes $2_2$, $2'_2$ of small cross section. As heretofore stated, in the case of this embodiment the length and diameter of the tubes are so correlated to the angle of repose of the particulate material being treated that the sloping mass of the material is retained within the tubes.

We claim:

1. Vaporizing apparatus having a high rate of heat transfer and a high output rate, for solid particulate materials, comprising in combination: a casing; at least one openwork partition extending vertically inside said casing and dividing said casing into zones, comprising a zone for the particulate material being treated and a disengagement zone for formed volatile products in free communication with said first zone; means for charging the particulate material to be vaporized into said first zone, said openwork partition being formed of a plurality of parallel disposed, spaced plates, the dimensions and spacing of which are so correlated to the angle of repose of the particulate material that the sloping mass of the particulate material is retained between the plates and does not fall into the disengagement zone; means for conductively heating the material so charged, and duct means connected to the disengagement zone for carrying off the formed volatile products.

2. Apparatus according to claim 1, wherein the heating means is electrical means, and the plates are of conductive material and form part of the heating means, whereby the material is heated by direct conduction.

3. Vaporizing apparatus having a high rate of heat transfer and a high output rate for solid particulate materials, comprising in combination: a casing; at least one openwork partition extending vertically inside said casing and dividing said casing into zones, comprising a zone for the particulate material being treated and a disengagement zone for formed volatile products in free communication with said first zone; means for charging the particulate material to be vaporized into said first zone, said openwork partition being constituted of hollow tubes of a length and diameter so correlated to the angle of repose of the particulate material, that the sloping mass thereof is retained within the tubes and does not fall into the disengagement zone; means for conductively heating the material so charged, and duct means connected to the disengagement zone for carrying off the formed volatile products.

4. Apparatus according to claim 1, provided with electric heating units passing without contact through the spaced plates.

5. Vaporizing apparatus having a high rate of heat transfer and a high output rate for solid materials, comprising in combination: a casing; at least one openwork partition extending vertically inside said casing and dividing said casing into zones, comprising a zone for material being treated and a disengagement zone for formed volatile products in free communication with said first zone, the thickness of the zone for the material being treated being small relative to its other dimensions; means for charging material to be vaporized into said first zone; means for conductively heating the material so charged, and duct means connected to the disengagement zone for carrying off the formed volatile products.

6. Apparatus according to claim 1, provided with sealed heating units in contact with the spaced parallel plates, whereby the heat is transferred to the plates by conduction.

7. Vaporizing apparatus having a high rate of heat transfer and a high output rate for solid materials, comprising in combination: a casing; at least one openwork partition extending vertically inside said casing and dividing said casing into zones, comprising a zone for material being treated and a disengagement zone for formed volatile products in free communication with said first zone, said openwork partition forming an enclosure and said enclosure comprising the disengagement zone; means for charging material to be vaporized into said first zone; means for conductively heating the material so charged, and duct means connected to the disengagement zone for carrying off the formed volatile products.

8. Vaporizing apparatus having a high rate of heat transfer and a high output rate for solid materials, comprising in combination: a casing; two openwork partitions extending vertically inside said casing and dividing said casing into zones, comprising a zone for material being treated and a central disengagement zone for formed volatile products in free communication with said first zone, said central disengagement zone extending between the partitions and the lateral sides of the casing; means for charging material to be vaporized into said first zone; means for conductively heating the material so charged, and duct means connected to the disengagement zone for carrying off the formed volatile products.

9. Vaporizing apparatus having a high rate of heat transfer and a high output rate for solid materials, comprising in combination: a casing, said casing being provided with a thermal insulating layer and a rigid wall encompassing the layer and constituting the frame of the apparatus; at least one openwork partition extending vertically inside said casing and dividing said casing into zones, comprising a zone for material being treated and a disengagement zone for formed volatile products in free communication with said first zone; means for charging material to be vaporized into said first zone; means for conductively heating the material so charged, and duct means connected to the disengagement zone for carrying off the formed volatile products.

10. Vaporizing apparatus having a high rate of heat transfer and a high output rate for solid particulate materials, comprising in combination: a casing; at least one openwork partition extending vertically inside said casing and dividing said casing into zones, comprising a zone for the particulate material being treated and a disengagement zone for formed volatile products in free communication with said first zone; means for charging the particulate material to be vaporized into said first zone; means for conductively heating the material so charged, and duct means connected to the disengagement zone for carrying off the formed volatile products; said casing being formed in situ of sintered particulate material agglomerated by condensed volatile products derived therefrom.

11. Apparatus according to claim 10, provided with a thermal insulating layer surrounding said casing, said layer constituted of the particulate material.

12. Apparatus according to claim 1, wherein the plates are disposed horizontally.

References Cited in the file of this patent

UNITED STATES PATENTS 1,781,484     Tuck _____ Nov. 11, 1930